United States Patent [19]

Nikolaisen

[11] Patent Number: 4,952,379
[45] Date of Patent: Aug. 28, 1990

[54] METHOD FOR PURIFYING CALCIUM NITRATE MELT/SOLUTION WHICH IS SEPARATED FROM THE MIXTURE OBTAINED BY THE SOLUTION OF ROCK PHOSPHATE WITH NITRIC ACID

[75] Inventor: Johnny Nikolaisen, Porsgrunn, Norway

[73] Assignee: Norsk Hydro A.S., Oslo, Norway

[21] Appl. No.: 250,848

[22] Filed: Sep. 28, 1988

[30] Foreign Application Priority Data

Oct. 6, 1987 [NO] Norway .................................. 874186

[51] Int. Cl.$^5$ ............................................. C01F 11/36
[52] U.S. Cl. ........................................ 423/162; 71/58; 423/167; 423/395
[58] Field of Search ................. 423/162, 167, 395; 71/58

[56] References Cited

U.S. PATENT DOCUMENTS

| | | | |
|---|---|---|---|
| 1,856,187 | 5/1932 | Johnson | 423/162 |
| 1,983,024 | 12/1934 | Foss | 423/162 |
| 2,061,191 | 11/1936 | Foss et al. | 423/162 |
| 2,114,600 | 4/1938 | Larsson | 423/162 |
| 4,720,377 | 1/1988 | Pennnington | 423/395 |

FOREIGN PATENT DOCUMENTS

| | | | |
|---|---|---|---|
| 587379 | 11/1959 | Canada | 71/58 |
| 1093805 | 12/1960 | Fed. Rep. of Germany | 423/162 |
| 529146 | 4/1977 | U.S.S.R. | 71/58 |
| 660390 | 11/1951 | United Kingdom | 423/162 |
| 757835 | 9/1956 | United Kingdom | 423/162 |

Primary Examiner—Robert L. Stoll
Assistant Examiner—Wayne A. Langel
Attorney, Agent, or Firm—Wenderoth, Lind & Ponack

[57] ABSTRACT

The present invention relates to a method for purifying a calcium nitrate melt or solution separated from the mixture obtained by dissolution of rock phosphate with nitric acid. The melt contains fluorine and phosphorus as main contaminants. The mol-ratio phosphorus/fluorine in the crude calcium nitrate melt/solution is adjusted to 3.5 > P/F > 0.3, possibly by extra addition of a phosphorus compound, and the mixture is then neutralized by ammonia to pH = 5−6. The precipitate thereby formed is removed while the filtrate, which is a purified nitrate of lime melt, is evaporated and further processed. The purification can be carried out in two stages, with a P/F-ratio in the first stage of 0.3–3 and 1–3.5 in the second stage. Phosphoric acid or a phosphoric acid containing solution is used as phosphorus compound.

6 Claims, 3 Drawing Sheets

METHOD FOR PURIFYING CALCIUM NITRATE MELT/SOLUTION WHICH IS SEPARATED FROM THE MIXTURE OBTAINED BY THE SOLUTION OF ROCK PHOSPHATE WITH NITRIC ACID

The present invention relates to a method for purifying a calcium nitrate melt or solution separated from the mixture obtained by the dissolution of rock phosphate with nitric acid. Fluorine, phosphorus and possibly other contaminants like iron, aluminium etc. are removed from the crude, concentrated calcium nitrate solution or melt by precipitation. Fluorine is removed mainly as fluoride apatite and calcium fluoride.

Subsequent to the dissolution of rock phosphate with nitric acid, the mixture is cooled, whereby calcium nitrate, $Ca(NO_3)_2.4H_2O$, is crystallized. The crystals are separated, washed and melted. The concentrated calcium nitrate melt is neutralized by ammonia to nitrate of lime fertilizer (in the following abbreviated to NL). This NL-melt is then evaporated and particulated, and it has substantially the following composition: $5Ca(NO_3).NH_4NO_3.10H_2O$.

NL-melt produced as stated above is mainly contaminated by P, F and $HNO_3$, and to a less degree with Si, Fe, Mn, Mg, Al, $CaSO_4$ etc. However, the crude melt gives NL with limited application, mainly as fertilizer on fields. By purifying the NL its application can be extended, and it can then for instance be applied as solution in greenhouses. Purified NL can further be used as additive in civil, liquid explosives, as coagulant for natural rubber, latex etc. The calcium nitrate of this NL can also be converted by ammonia and carbon dioxide to ammonium nitrate (AN) and calcium carbonate. Purified NL will by the conversion give purer $CaCO_3$ and AN, and thereby its range of utilization for these conversion products will be extended.

A bi-effect which can be attained by application of AN from purified NL is reduced corrosion during evaporation of the AN-solution because of its reduced content of fluorine. Efficient purification will also extend the area of application for $CaCO_3$. This can then be applied in for instance mineral mixtures for animals. Finely ground $CaCO_3$ can be applied as filler in paper, paint and plastic products. $CaCO_3$ can also be calcined to highly active calcium oxide and possibly be further processed to dry slaked lime.

Common for several of the areas of application for NL, AN and calcium carbonate is that these products do not contain contaminants which discolour or result in undesired chemical reaction in the process during further processing. NL should have a low content of water and soluble components, and $CaCO_3$ should have a low content of acid and soluble components.

From Norwegian Pat. No. 73.1999 it is known to remove fluorine from the acid, nitrate containing solution by distillation of the fluorine as HF or $SiF_4$. The solution's molecular ratio between nitrate ions and calcium ions is adjusted to less than 2.3. For formation of $SiF_4$, $SiO_2$ can be added if the rock phosphate contains too little of this component. About 90% of the fluorine is removed from the solution by this treatment.

Even though fluorine can be removed in this way and nitrate of lime having a low content of fluorine can be made, the method results in loss of nitrogen (0.2 kg/kg F removed) and is also less attractive from a process point of view.

Conversion of calcium nitrate is discussed, and in that connection also purification of calcium nitrate made by the dissolution of rock phosphate with nitric acid and subsequent crystallization and separation from the nitrophosphate (NP)-solution, in an article of G. Langhans and G. Bieniok in TA/76/13, Journal New Development Phosphate, Fertilizer Technology Proceedings, Technical Conference ISMA Ltd., pp 215-233, published 1971.

The calcium nitrate is contaminated with some NP-solution, about 2% $P_2O_5$ or 0.9% P. Before conversion of calcium nitrate to ammonium nitrate and calcium carbonate the phosphorus is removed by precipitation with ammonia. It is thereby primarily formed apatite, $Ca_5(PO_4)_3(F,OH)$ which is removed by filtration. The apatite might contain some contaminants like Si, Al, Fe and Mg.

In order to obtain the desired precipitation of easily filterable apatite, the following prerequisites should according to the article be present: The solution should have a low viscosity, below 10 mPa.s, the temperature should be above 80° C. and the pH must be kept constant at about pH 4.5, measured in a 1:10 dilution. If the pH increases somewhat outside this value, the precipitate will be most difficult to filter. Apatite removed by filtration can be returned to the dissolution step or the NP-solution. Calcium carbonate made from thus purified calcium nitrate contains 0.05% F, i.e. 500 ppm. The calcium nitrate solution contained 150 ppm F.

The object of the present invention was to manufacture as pure NL as possible having a low content of undesired contaminants, first of all phosphorus and fluorine, and thereby fulfill the purity requirements for NL and AN and $CaCO_3$ made therefrom. Another object was to produce NL having a low content of water and soluble components. It was further an object to arrive at a method which made the separation of contaminants simple and independent of type of rock phosphate applied during the dissolution.

Long term investigations of nitrate of lime produced from different types of rock phosphate revealed that especially the fluorine content could vary somewhat. It was also found that the amount of water and soluble compounds as a rule was highest when the F-content was high. Further investigations showed that when a calcium nitrate solution was neutralized by ammonia the resultant precipitates would be quite varying. It could consist of fine particles or at best of coarse, easily filterable particles.

Precipitation of contaminants was carried out in a mixing vessel with a given retention time, and ammonia was supplied until the desired pH was reached. It was mainly fluoride apatite and fluorspar that were precipitated thereby, but also $CaSO_4$ and $SiO_2$, heavily soluble phosphates of Fe and other contaminants.

The problem is that the crystal growth varies quite a lot and that F and Fe often are not precipitated. If one tries to filter off precipitated material, one will repeatedly find that the filterability is drastically reduced and thereby the capacity of the purifying section. Addition of polyelectrolyte for flocculation of precipitated material and subsequent separation in for instance a centrifuge may give drastic increase of the application of polyelectrolyte because of increased total particle surface, which again is due to low crystal growth in the neutralizing vessel. Both filtration and centrifugation often result in NL-products having high concentrations of water and soluble F and Fe. It is accordingly difficult to control the precipitation of contaminants in the neutralizing vessel according to known methods.

The inventor then made a closer study of these precipitations and found that when easily filterable precipitates were present, their content of fluoride apatite was high, while the poorest filterable precipitates had high content of fluorspar. One then tried to govern the type of precipitate in the direction of apatite. As the fluoride apatite has the mol-ratio P:F=3, it was investigated whether previously studied calcium nitrate solutions had had such a relation. It was then found that the mol-ratio P:F in most cases was far lower, usually in the range 0.15–0.7. By addition of P one could however increase the P/F-ratio in the solution before purification, and then further study the crystal size of the precipitates at mol-ratios P/F from 0–3.

The amount of the main contaminants varied both with type of rock phosphate and how the previous process steps were carried out. In Table 1 the variations are shown for phosphorus and fluorine in crude calcium nitrate melt stated as gram per kilogram calcium (Ca):

TABLE 1

| g P/kg Ca | 1–35 |
| g F/kg Ca | 2–40 |
| mol P/mol F | 0.05–2.00 |

The precipitation of contaminants takes place in a neutralizing vessel where the calcium nitrate melt containing nitric acid is neutralized with ammonia gas. The temperature could be varied between 40° and 100° C.

The inventor then found that in this environment there were poor conditions for formation of fluorspar having crystal size from seeds up to about 3 um. The fluoride apatite crystals however could grow up to 50 um. At the same time it was found that the solubility of fluorine in the melt increased with decreasing P/F-ratio and that contaminants like Fe, Mn and Si also were precipitated at high P/F-ratios.

The content of P and F in purified melt was at mol-ratio P/F=3 all the way down in 0.05 g P and 0.05 g F per kg Ca. It was essentially fluoride apatite crystals that were formed and they were easily filterable. The content of water-insoluble components was also unusually low. These results were so promising that a more systematic investigation was carried out in order to arrive at a practical and cheap process for purifying NL by applying this principle.

The inventor could, after having carried out such systematic tests, give the following conclusion: The main contaminants P and F were precipitated as fluorspar, $CaF_2$, and fluoride apatite, $Ca_3(PO_4)_2)_3 \cdot CaF_2$. In this environment the fluoride apatite crystals grow far better than the fluorspar crystals. If a high crystal growth is desired, one has to reduce the part of fluorspar and increase the part of fluoride apatite in the precipitate. By increasing the P/F-ratio during the precipitation one obtained increased crystal growth.

In order to determine which conditions one should have during the precipitation, a series of tests were carried out. According to the formula for fluoride apatite a P/F-ratio of 3 should give precipitate of only fluoride apatite, however, one wanted to add as little P as possible and therefore it was studied whether lower P/F-ratios could result in filterable precipitate.

The tests showed that the solubility of fluorine in neutralized melt decreased with increasing P/F-ratio during the precipitation. The solubility increased drastically when the P/F-ratio was lower than 0.3 mol P/mol F. For more complete precipitation of fluorine it was necessary to increase the addition of P to 1–3 mol P/mol F (reference is made to FIG. 3). In certain cases it can be an advantage to increase the ratio P/F to 3.5. Phosphoric acid or a phosphoric acid mixture having low content of fluorine can be used as P-source.

One-stage precipitation showed that it was necessary to keep the ratio P/F between 0.3–3, preferably between 2–3 before neutralization. However, when using a two-stage precipitation it was sufficient to keep a high P/F-ratio in the last stage only. The pH during the precipitation was investigated for different P/F-ratios and one found, contrary to that stated in the above article, that it would be advantageous to carry out the precipitation at pH larger than 4.5. These investigations showed in fact that the precipitation should be carried out at pH higher than that stated in the above article as the upper limit. It was in fact found that the precipitation could be carried out at pH=5–6. The best results were obtained at pH=5.5.

The special features of the invention are as defined in the attached claims.

The invention will now be further explained in the following examples and with reference to the figures.

Figure 1:
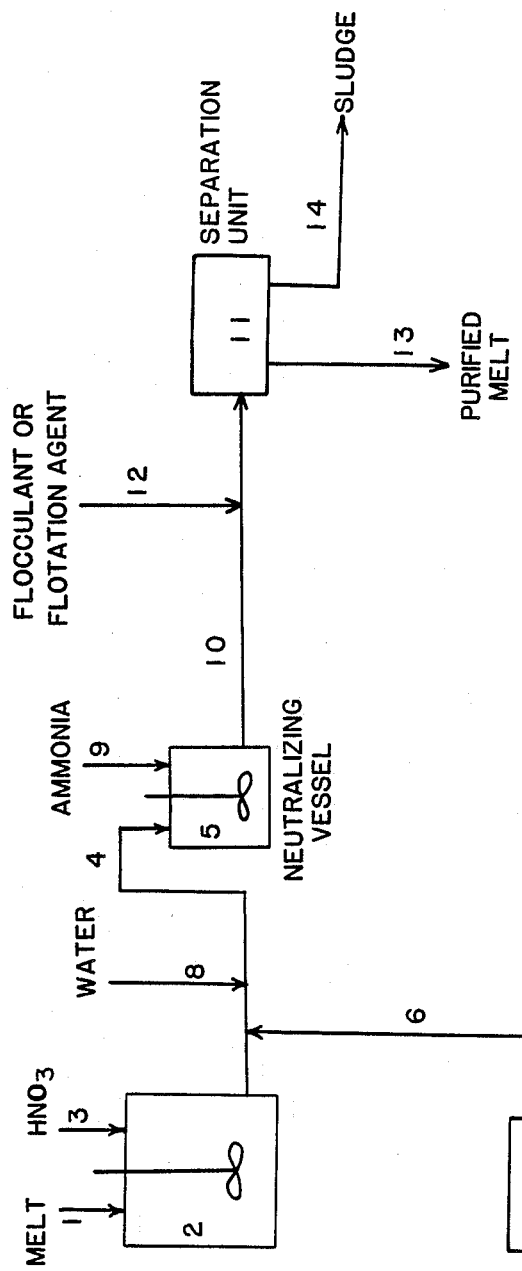
FIG. 1 shows a purification method according to the invention carried out in one stage.
Figure 2:
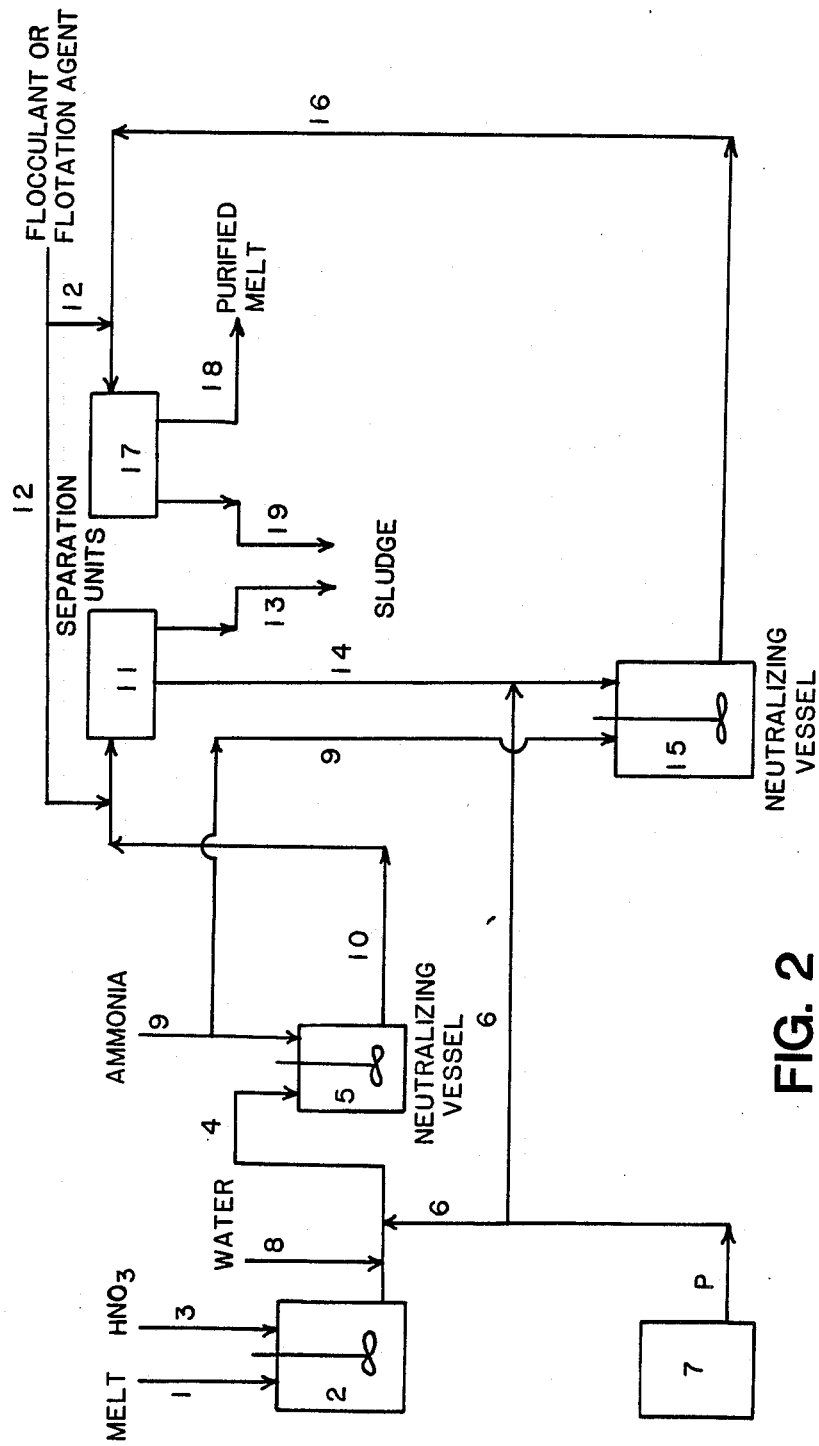
FIG. 2 shows a purification method according to the invention carried out in two stages.

FIG. 1 shows purification of calcium nitrate melt carried out according to the invention in one stage. Melt 1 is supplied to the storage tank 2, in which possible $HNO_3$-content is adjusted by addition through pipe 3. The melt is transferred through pipe 4 to a neutralizing vessel 5. P is supplied through pipe 4 via pipe 6 from a storage tank 7 up to a desired P/F-ratio. Water can be added through pipe 8. For possible dilution of the melt ammonia is supplied to vessel 5 through pipe 9. The precipitation of contaminants takes place in vessel 5. The mixture is transferred from vessel 5 through pipe 10 to a separation unit 11. If it is desired to carry out the separation during addition of flocculant or flotation agents, one of these can be added to pipe 10 via pipe 12. Purified melt is removed through pipe 13 for further processing to particulated LN or for conversion to AN and $CaCO_3$. Sludge separated from the mixture is recycled to the acidulation stage for rock phosphate through pipe 14. FIG. 2 shows purification of melt carried out according to the invention in two stages. Melt 1 is supplied to the storage tank 2. Here possible $HNO_3$-content is adjusted through pipe 3. The melt is transferred through pipe 4 to a first neutralizing vessel 5. P is added through pipe 6 from a storage tank 7 up to a desired P/F-ratio in the pipe 4. Possibly, the melt can be diluted by water supplied through pipe 8. Ammonia is added to vessel 5 via pipe 9. Part of the contaminants are precipitated in vessel 5. The mixture from vessel 5 is transferred via pipe 10 to a separation unit 11. Flocculants or flotation agent can be added through pipe 12 ahead of the separation unit 11. Purified melt from the unit 11 is transferred via pipe 14 to a second neutralizing vessel 15. P is added through pipe 6 into the pipe 14 to a desired P/F-ratio. Ammonia is supplied to vessel 15 via pipe 9. In vessel 15 further contaminants are precipitated. The mixture is then transferred via pipe 16 to a second separation unit 17. Flocculants or flotation agent can be added in pipe 16 via pipe 12. Purified melt is removed through pipe 18 for further processing to particulated LN or for conversion to AN and $CaCO_3$. The sludge removed from the process is transferred via pipes 13 and 19 back to the acidulation stage.

Figure 3:
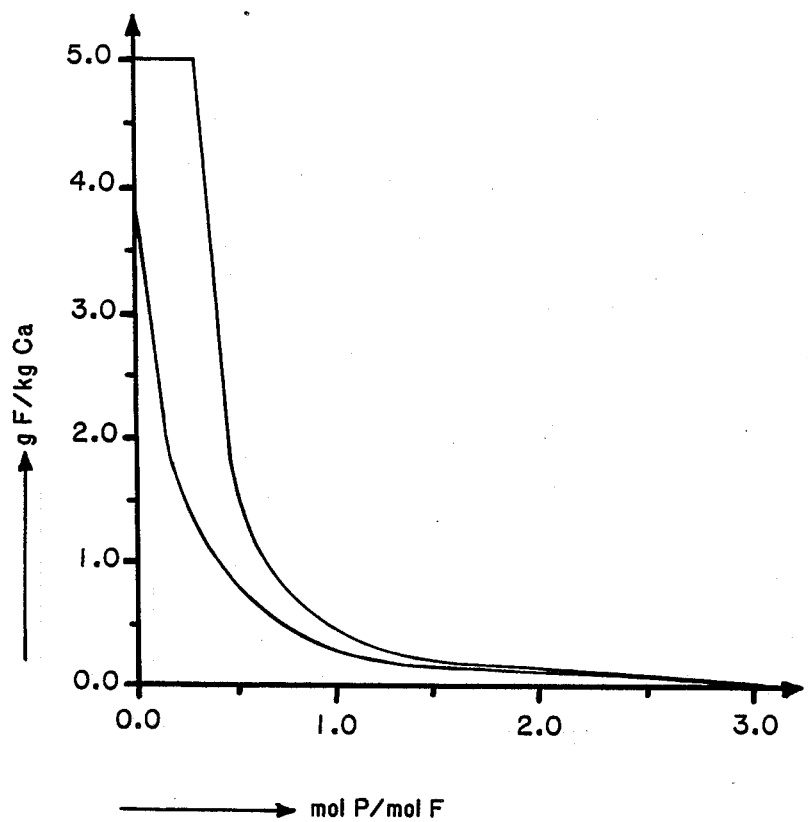
FIG. 3 shows the content of fluorine in a purified melt as a function of mol P/mol F during neutralization.

FIG. 3 shows F-concentration in purified melt expressed as g F/kg Ca as a function of the ratio mol P/mol F during neutralization. The curve is based on the results of a large number of melts of varying composition produced during application of different types of rock phosphate. The curve shows the results derived from one- and two-stage purification at pH about 5.2 in the first and second neutralization stage. The pH is measured in a solution of one part melt and 10 parts water. The F-concentration comprises both dissolved F and F in solid phase.

Example 1

This example shows a known method of purifying calcium nitrate and is therefore for comparison. It is carried out according to the flow sheet in FIG. 1.

16200 kg/t acid, unpurified calcium nitrate melt was supplied to the vessel 2. The calcium nitrate melt contained: 8.2 g P/kg Ca and 16.7 g F/kg Ca and had a mol ratio of P/F=0.3

The melt was diluted with 1300 kg water/t, and in the neutralizing vessel 143 kg ammonia per hour were added until the mixture had a pH of 5.2. The temperature in the vessel was 60° C. A precipitate was obtained which mainly consisted of small particles. 5.5 kg polyelectrolyte/t were added to the mixture from vessel 5, whereupon the precipitate was separated in the centrifuge 11. The sludge which was removed through pipe 14, was mainly a mixture of fluorspar and fluoride apatite. It also contained minor amounts of sand, $SiO_2$ and some iron. The filtrate or the purified nitrate of lime solution now contained 0.25 g P/kq Ca and 1.2 g F/kg Ca. The solution also contained 3000 ppm water-insoluble components. The content of Fe was 40 ppm.

Example 2

This example shows calcium nitrate purification according to the invention, and the purification is carried out in one stage, i.e. only one neutralizing system and one centrifuge. 16200 kg per hour calcium nitrate melt, having the same composition as in Example 1, Were supplied to vessel 2. 1300 kg water and 363 kg phosphoric acid per hour were added in pipe 4 before the mixture was neutralized in vessel 5. The addition of phosphoric acid altered the mol ratio P/F from 0.3 to 2. 268 kg $NH_3$ per hour were supplied to the mixture, which was kept at a pH of 5.2. A precipitate having mainly large crystals was obtained. 0.2 kg polyelectrolyte per hour were then added to the nitrate of lime solution and the mixture was then centrifuged. Analysis of the filtrate (LN-solution) gave the following results:

| g P/kg Ca = | 0.10 |
| g F/kg Ca = | 0.10 |
| water-insolubles = | 400 ppm |
| Fe = | 10 ppm |
| Si = | 15 ppm |

99.4% of F and 98.8% of P were accordingly removed from the calcium nitrate melt by this method during application of 25 kg phosphoric acid per ton $Ca(NO_3)_2.4H_2O$.

Example 3

This example shows purification according to the invention and the flow sheet shown in FIG. 2, i.e. two purification stages.

16200 kg per hour calcium nitrate melt containing 15 g F/kg Ca and 8 g P/kg Ca were supplied to vessel 2 and 91 kg per ton phosphoric acid were added through pipe 4, whereupon the mixture attained a mol-ratio P/F=0.8. This mixture was supplied to the first neutralizing vessel 5, to which 175 kg ammonia per hour were added such that the pH of the mixture was kept at pH=5.2 at a temperature of 70° C. 0.6 kg polyelectrolyte per hour was added to the mixture of precipitate and nitrate of lime solution, which then was transferred to a first centrifuge 11. Phosphoric acid in such amounts that the filtrate therefrom attained a mol-ratio P/F=2.5 was added. The mixture was transferred to a second neutralization vessel 15, to which 5 kg ammonia per hour were added and precipitation of P and F was carried out at pH=5.2. The nitrate of lime solution containing the precipitate was transferred to a second centrifuge 17. The filtrate from this unit was purified nitrate of lime and was removed through pipe 18. Sludge separated therefrom together with sludge from the centrifuge 11 were mixed with 215 kg nitric acid per hour for partial dissolution of the precipitated apatite. This mixture was then returned to the stage for digestion of rock phosphate with nitric acid.

The P/F-ratio was measured in supplied crude melt and in the pipe 14 for calculation of necessary addition of phosphoric acid.

Analysis of the purified nitrate of lime solution gave the following results:

| g P/kg Ca = | 0.10 |
| g F/kg Ca = | 0.10 g/kg Ca |
| water-insolubles = | 400 ppm |
| Fe = | 10 ppm |
| Si = | 15 ppm |
| Mn = | 2 ppm |

Examples 2 and 3 show that the degree of purification is the same in both cases, but the amount of phosphorus used in the two-stage purification was only 2.3 kg P per ton $Ca(NO_3)_2.4H_2O$ compared to 7.9 kg during the one-stage purification.

Examples 2 and 3 show that one obtains a far more efficient removal of P and F by the method according to the invention than by the previously known method.

The amounts of contaminants in the product decrease with increasing P/F-content during neutralization. When the purification is carried out at 0.3–1.0 mol P/mol F, the product NL will contain 0.07–0.4% water-insolubles. The purified NL will with increasing P-addition to about 3.0 mol P/mol F contain 0.03–0.1% water-insolubles. A corresponding trend will be obtained for several other components. This is shown in Table 2:

TABLE 2

| | | Concentration of the components stated as gram/kg Ca | |
| --- | --- | --- | --- |
| Component | Unpurified melt | Purifying at 0.3–1.0 mol P/mol F | Purifying at 3.0 mol P/mol F |
| P | 3–35 | 0.2–0.5 | 0.05–0.3 |

TABLE 2-continued

| Component | Unpurified melt | Concentration of the components stated as gram/kg Ca | |
|---|---|---|---|
| | | Purifying at 0.3–1.0 mol P/mol F | Purifying at 3.0 mol P/mol F |
| F | 2–40 | 0.5–7 | 0.04–0.20 |
| Mn | 0.04–0.07 | 0.04 | 0.02 |
| Fe | 0.5–3.0 | 0.08–0.4 | 0.04–0.15 |
| Si | 2–5 | 0.2–0.4 | 0.08–0.15 |
| $SO_4$ | 1–4 | 0.1–0.8 | 0 |
| Al | 0.7–1.0 | 0.1–0.2 | 0.04 |

One has by the present invention obtained a simple process, whereby the precipitated contaminants can be easily removed provided that the precipitation is carried out using a mol-ratio P/F as stated in the claims and during the stated pH-range. This process results in a purer product than known purification processes, and the invention further gives an extended utilization for LN and for AN and $CaCO_3$ produced by conversion of such purified LN.

I claim:

1. A method for purifying a crude calcium nitrate melt or solution separated from a mixture which is obtained by dissolution of rock phosphate with nitric acid, and which contains fluorine and phosphorus as main contaminants, which comprises:

adjusting the mol-ratio phosphorus/fluorine in said crude calcium nitrate melt or solution to $3.5 > P/F > 0.3$;

neutralizing the resultant mixture with ammonia to a pH $=5-6$, to form a precipitate;

removing the precipitate; and evaporating and processing the resultant filtrate to produce purified calcium nitrate.

2. The method according to claim 1, wherein a phosphorus compound is added to the crude calcium nitrate melt or solution during adjustment of said mol-ratio.

3. The method according to claim 2, wherein the phosphorus compound is phosphoric acid or a phosphoric acid containing solution.

4. The method according to claim 1, wherein the precipitation is carried out during addition of polyelectrolyte for flocculating the precipitate, and the precipitate is subsequently separated in a centrifuge.

5. The method according to claim 1, wherein the purification is carried out in two stages, in which the phosphorus/fluorine mol-ratio in the first stage is 0.3–3, and in the second stage is 1–3.5.

6. The method according to claim 5, wherein the precipitation is carried out during addition of polyelectrolyte for flocculating the precipitate, and the precipitate is subsequently separated in a centrifuge.

* * * * *